US009453083B2

(12) United States Patent
Ahmed et al.

(10) Patent No.: US 9,453,083 B2
(45) Date of Patent: Sep. 27, 2016

(54) VINYL POLYMERS PREPARED VIA SUSPENSION POLYMERIZATION AND METHODS THEREOF

(71) Applicant: Saudi Basic Industries Corporation, Riyadh (SA)

(72) Inventors: Syed Mehmood Ahmed, Riyadh (SA); Mohammed Hamdan, Riyadh (SA); Syed Azhar Hashmi, Riyadh (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 403 days.

(21) Appl. No.: 13/826,705

(22) Filed: Mar. 14, 2013

(65) Prior Publication Data

US 2014/0275301 A1 Sep. 18, 2014

(51) Int. Cl.
| | |
|---|---|
| *C08F 2/18* | (2006.01) |
| *C08F 12/08* | (2006.01) |
| *C08J 9/02* | (2006.01) |
| *C08J 9/20* | (2006.01) |
| *C08J 9/00* | (2006.01) |
| *C08J 9/14* | (2006.01) |
| *C08J 9/224* | (2006.01) |

(52) U.S. Cl.
CPC ............... *C08F 2/18* (2013.01); *C08F 12/08* (2013.01); *C08J 9/0023* (2013.01); *C08J 9/0066* (2013.01); *C08J 9/02* (2013.01); *C08J 9/141* (2013.01); *C08J 9/20* (2013.01); *C08J 9/224* (2013.01); *C08J 2325/04* (2013.01)

(58) Field of Classification Search
CPC ........................................................ C08J 9/20
See application file for complete search history.

(56) References Cited

U.S. PATENT DOCUMENTS

| | | | |
|---|---|---|---|
| 2,652,392 A * | 9/1953 | Haward et al. ............. | 526/81 |
| 4,085,169 A | 4/1978 | Saito et al. | |
| 4,153,763 A | 5/1979 | Bracke | |
| 4,174,425 A | 11/1979 | Saito et al. | |
| 4,363,881 A | 12/1982 | Smith | |
| 4,859,730 A | 8/1989 | Lozachmeur | |
| 5,000,891 A | 3/1991 | Green | |
| 5,189,069 A | 2/1993 | Speikamp et al. | |
| 5,464,915 A | 11/1995 | Ballova et al. | |
| 5,496,864 A | 3/1996 | Henn et al. | |
| 5,525,636 A | 6/1996 | Henn et al. | |
| 5,525,637 A | 6/1996 | Henn et al. | |
| 5,616,413 A | 4/1997 | Shinozaki et al. | |
| 5,985,943 A | 11/1999 | Hahn et al. | |
| 6,153,658 A | 11/2000 | Paleja et al. | |
| 6,160,027 A | 12/2000 | Crevecoeur et al. | |
| 6,221,926 B1 | 4/2001 | Oohara et al. | |
| 6,465,533 B1 | 10/2002 | Eberstaller et al. | |
| 2001/0009942 A1 | 7/2001 | Murata et al. | |
| 2003/0055119 A1 | 3/2003 | Maruhashi et al. | |
| 2004/0249003 A1 | 12/2004 | Datko et al. | |
| 2006/0189703 A1 | 8/2006 | Noordegraaf | |
| 2006/0235096 A1 | 10/2006 | Luisi | |
| 2007/0066693 A1 | 3/2007 | Bres et al. | |
| 2008/0067709 A1 | 3/2008 | Galewski et al. | |
| 2008/0300328 A1 | 12/2008 | Schellenberg et al. | |

FOREIGN PATENT DOCUMENTS

| | | |
|---|---|---|
| EP | 0732343 A2 | 9/1996 |
| GB | 994074 | 6/1961 |
| GB | 1255174 | 12/1971 |
| GB | 1255237 | 12/1971 |
| GB | 1364758 | 8/1974 |
| GB | 1583364 | 1/1981 |
| GB | 2114580 A | 8/1983 |
| WO | 2006061571 A1 | 6/2006 |
| WO | 2008132209 A2 | 11/2008 |

OTHER PUBLICATIONS

Machine Translation of JP 2006-028447 by Saito et al.*
International Search Report for International Application No. PCT/IB2014/059397; International Filing Date: Mar. 3, 2014; Date of Mailing: May 15, 2014; 4 pages.
Written Opinion of the International Search Report for International Application No. PCT/IB2014/059397; International Filing Date: Mar. 3, 2014; Date of Mailing: May 15, 2014; 4 pages.

* cited by examiner

*Primary Examiner* — Mike M Dollinger
*Assistant Examiner* — Christina Wales
(74) *Attorney, Agent, or Firm* — Cantor Colburn LLP

(57) ABSTRACT

A method of producing vinyl polymer particles by suspension polymerization comprising: combining an aqueous media and a tricalcium phosphate to a reaction vessel; adding a pH stabilizing agent to the reaction vessel; adding a vinyl monomer to the reaction vessel; adding a peroxide initiator, e.g., which also generates $CO_2$ as a result of primary or secondary decomposition, to the reaction vessel; adding surfactant or a water soluble free radical initiator to generate surfactant in situ to the reaction vessel; maintaining the reactor contents at greater than or equal to 90° C. until a density of a dispersed phase becomes substantially equal to that of a continuous phase; adding a blowing agent to the reaction vessel; raising the temperature of the reaction vessel to greater than or equal to 100° C.; and collecting polymer particles having a particle size distribution.

15 Claims, No Drawings

VINYL POLYMERS PREPARED VIA SUSPENSION POLYMERIZATION AND METHODS THEREOF

TECHNICAL FIELD

The disclosure generally relates to the manufacture of vinyl polymers via suspension polymerization and methods thereof.

BACKGROUND

Vinyl polymers can be manufactured using suspension polymerization processes. In a typical suspension polymerization, a water-insoluble monomer or a mixture of water-insoluble monomers is dispersed in water and polymerized using an oil soluble initiator. Adequate agitation with desired flow patterns and suspending agents are utilized to maintain the stability of the suspension during the polymerization process. The polymerization reaction takes place in monomer droplets formed in the suspension, where the resulting product consists of a dispersion of polymeric particles in water. The polymeric particles can range from 20 micrometers (μm) to 4 millimeters (mm), where the particle size refers to the particle diameter as measured along a major axis.

For expandable polystyrene Manufacturing, the resulting product from the polymerization can then be screened to different size fractions based on pre-defined grade specifications and to separate fines and oversize particles.

The market demand for a particular grade varies by region and also from one season to another. A process capable of eliminating the waste fines (particles less than 0.4 mm) and oversize beads (particles greater than 2.5 mm) and/or that generates a narrower particle size distribution would be advantageous to keep up with market demands and in maintaining minimum inventory levels.

SUMMARY

Disclosed, in various embodiments, are vinyl polymers prepared via suspension polymerization and methods thereof.

In an embodiment, a method of producing vinyl polymer particles by suspension polymerization comprising: combining an aqueous media and a tricalcium phosphate to a reaction vessel; adding a pH stabilizing agent to the reaction vessel; adding a vinyl monomer to the reaction vessel; adding a peroxide initiator, which also generates $CO_2$ as a result of primary or secondary decomposition, to the reaction vessel; adding surfactant or a water soluble free radical initiator to generate surfactant in situ to the reaction vessel; maintaining the reactor contents at greater than or equal to 90° C. until a density of a dispersed phase becomes substantially equal to that of a continuous phase, thereby forming a processed suspension having an initial pH; optionally adding a second quantity of tricalcium phosphate and optionally a second quantity of surfactant or optionally a second quantity of water soluble free radical initiator to generate surfactant in situ to the reaction vessel; adding a blowing agent to the reaction vessel; raising the temperature of the reaction vessel to 100-200° C. and holding at the temperature for greater than or equal to 1 hour; and collecting polymer particles.

In another embodiment, a method of producing vinyl polymer particles by suspension polymerization comprising: adding a vinyl monomer, an aqueous media, a $CO_2$ generating initiator, tricalcium phosphate, and a pH stabilizing agent to a reaction vessel under agitation to form a suspension having an initial pH; polymerizing at a temperature of greater than or equal to 90° C., the vinyl monomer to result in polymerized particles with a particle size distribution.

These and other features and characteristics are more particularly described below.

DETAILED DESCRIPTION

The ability to produce a narrow particle size is particularly important for applications requiring the polymeric particles such as expandable polystyrene (EPS) particles and ion-exchange resins. While particle size distribution is often targeted to be as narrow as possible to result in as high a yield as possible in particle size in a single grade, the suspension process with suspending agents (e.g. tricalcium phosphate and poly(vinyl alcohol) (PVA)) produces a broad particle size distribution and considerable levels of fines (i.e. particles smaller than 0.4 millimeters) and oversize beads (i.e. particles greater than 2.5 millimeters). The fines and oversize beads have to be sold as scrap material or recycled where, due to problems in recycling, are generally sold only as scrap material.

In suspension polymerization reactions, a carbon dioxide ($CO_2$) generating initiator (such as benzoyl peroxide) can be used to initiate the polymerization of the vinyl monomer. In the case of benzoyl peroxide, the benzoyl peroxide dissociates into reactive radicals and carbon dioxide, as shown below

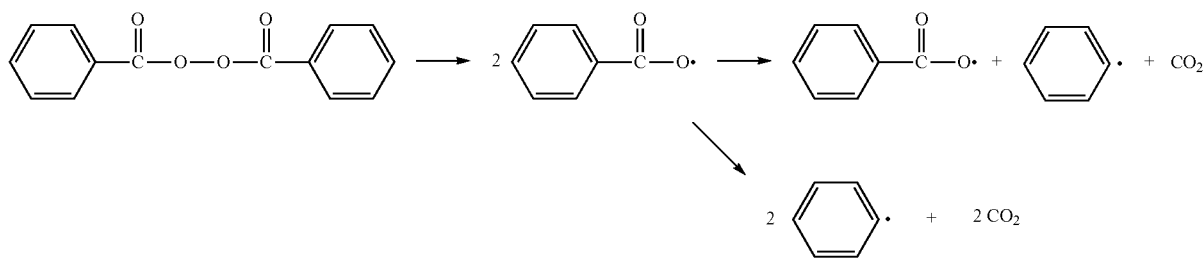

The carbon dioxide can then react with water to form carbonic acid, as shown below.

$$CO_2 + H_2O \rightarrow H_2CO_3 \text{ (Carbonic Acid)}$$

As a consequence of this reaction, the pH of the polymerization system (also referred to as the suspension) becomes acidic (e.g., a pH of less than 7) during the first stage of the polymerization. Not to be limited by theory, in the acidic pH environment the tricalcium phosphate acquires a positive charge and then acts as a physical barrier forming a protective envelope around the particles and stabilizing the suspension system.

The Applicants surprisingly found that use of a pH stabilizing agent in suspension polymerization resulted in the elimination or near elimination of fines and oversize bead generation and/or a narrow particle size distribution, where a narrow particle size distribution is defined as greater than or equal to 50 weight percent (wt %), more specifically, greater than or equal to 65 wt % of the particles being in a specified size range, wherein a specified size range is also referred to as a grade fraction.

Not to be limited by theory, it is believed that the pH stabilizing agent acts to delay the drop in pH to less than 7 that otherwise occurs due to the buildup of carbonic acid as described above. For example, pH stabilizing agents such as trisodium phosphate and/or sodium bicarbonate can react with carbonic acid as shown below

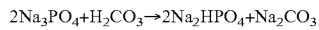

$$2Na_3PO_4 + H_2CO_3 \rightarrow 2Na_2HPO_4 + Na_2CO_3$$

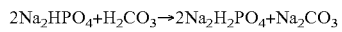

$$2Na_2HPO_4 + H_2CO_3 \rightarrow 2Na_2H_2PO_4 + Na_2CO_3$$

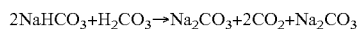

$$2NaHCO_3 + H_2CO_3 \rightarrow Na_2CO_3 + 2CO_2 + Na_2CO_3$$

to prevent the buildup of carbonic acid. The resulting initial basic pH, (i.e. pH greater than 7), prevents the tricalcium phosphate from becoming positively charged, thereby preventing it from forming the protective envelope around the polymer particles and delaying the process of stable bead formation.

Without being bound by theory, it is believed that the increasing conversion of the monomer results in an increase in viscosity of the polymerization phase. The formation of smaller size particles, at a given agitation rate, diminishes with increasing viscosity of the dispersed phase. Additionally the high viscosity of the dispersed phase also results in narrowing of particle size distribution at a given applied mechanical energy (agitation), and thus optimizing the targeted grade yield. It has therefore been discovered that if the pH is initially maintained at greater than 7 (specifically, greater than or equal to 9, more specifically, greater than or equal to 10, e.g., a pH of 7 to 13, specifically, 9 to 11, and more specifically, 10 to 11), then the desired particle size distribution can be attained. It is noted that the initial delay in the drop in pH to less than 7 is maintained long enough to allow for the polymerization to proceed until the desired grade is achieved. If the drop in pH is delayed by too much, then an undesirably high viscosity can be achieved, which can result in batch failure.

Still not wishing to be bound by theory, it is believed that as the pH drops below 7, the tricalcium phosphate forms the protective envelope around the polymerizing particles. The narrowing of the particle size distribution by delaying the suspension stabilization was surprising since it was counter intuitive. Generally, to attain a desired particle size, stabilization as soon as possible would have been sought so that particles would not break apart or coalesce to form smaller or oversized particles. The Applicants surprisingly found that higher initial pH values and/or higher solution viscosities of the polymerization mixture resulted in higher yields of the desired grade and/or narrower particle size distributions. All conditions being the same, the agitator speed can be varied to determine the particle size range, where increasing the agitator speed results in smaller particles. Hence, the agitator speed can also be controlled in order to attain a desired particle size.

The vinyl monomer includes aliphatic and/or aromatic vinyl monomers. The aromatic vinyl monomer can comprise for example one or more of vinyltoluene, divinyl benzene, styrene, and styrene derivatives such as alpha-methylstyrene, p-methylstyrene, p-ethylstyrene, chlorostyrene such as o-chlorostyrene and 2,5-dichlorostyrene, and isopropylstyrene. The aromatic vinyl monomer can optionally comprise an inhibitor in an amount of greater than (>) 0 to 100 parts per million by weight (ppm), specifically greater than 0 to 10 ppm. Aliphatic vinyl monomers can comprise for example one or more of acrylonitrile, butadiene, acrylates such as alkylacrylates (i.e., methyl acrylate, ethyl acrylate, propyl acrylate, butyl acrylate, and 2-ethylhexyl acrylate) and alkylmethacrylates (i.e., methyl methacrylate, ethyl methacrylate, propyl methacrylate, butyl methacrylate, 2-ethylhexyl methacrylate, and ethylene glycol dimethacrylate), vinyl fluoride, vinyl acetate. Also included herein are combinations comprising any of the above vinyl monomers.

The aliphatic vinyl monomers can be added, e.g., in order to alter the characteristics of the final polymer particles, and can be present in an amount of up to 50 wt %, specifically, greater than 0 wt % to 50 wt %, specifically 10 wt % to 45 wt %, and more specifically, 20 wt % to 30 wt %, based upon a total weight of the monomers. The amount of the vinyl aromatic monomer can be present in an amount of from 50 wt % to 100 wt %, specifically 55 wt % to 90 wt %, and more specifically, 70 wt % to 80 wt %, based upon the total weight of the vinyl monomers.

The vinyl monomer(s) can be present in the suspension with an aqueous medium. The aqueous medium can comprise water, alcohol, and/or mixtures comprising at least one of the foregoing. The alcohol can comprise for example methyl alcohol, ethyl alcohol, propyl alcohol, and/or mixtures comprising at least one of the foregoing. The aqueous media can be present in equal quantities by weight as the monomer that is employed, although it can be understood that the amount of water used, need only be sufficient to attain the desired degree of monomer suspension. Optionally, the aqueous media can be present in an amount of 45 wt % to 65 wt % based on the total weight of suspension.

A $CO_2$ generating initiator can be added to the mixture to form a polymerization system. The $CO_2$ generating initiator is any peroxide that generates free radicals for initiation of the polymerization process and also generates $CO_2$ either by primary decomposition or secondary decomposition. The $CO_2$ generating initiator can be an organic peroxide that decomposes under the reaction conditions to form free radicals that are involved in the mechanism of the radical polymerization. The $CO_2$ generating initiator can, for example, comprise a diacyl or acetoxy functional group. The organic peroxide can comprise for example, benzoyl peroxide, dilauroyl peroxide, tert-butylperoxy-benzoate, tert-butylperoxy-2-ethylhexyl carbonate, tert-butylperoxy-isopropyl carbonate, t-butyl peroxy-2-ethylhexyl monocarbonate, and tert-amylperoxy-2-ethylhexyl carbonate, and combinations comprising at least one of the foregoing organic peroxides.

The amount of $CO_2$ generating initiator can be 0.01 wt % to 5 wt %, based on the total weight of the vinyl monomer(s). The amount of initiator can be 0.05 wt % to 3 wt %, specifically 0.1 wt % to 2 wt %, and more specifically 0.2 wt % to 0.5 wt % based on the total weight of vinyl aromatic monomer.

An anionic surfactant can be added to the polymerization system and/or generated in situ. The surfactant can comprise for example, a carboxyl group, a sulfo group, a phosphono group, etc.), as well as combinations comprising at least one of the foregoing. The surfactant can comprise sodium salts of aromatic sulfonic acid/formalin condensates and/or sodium aklylsulfates. Examples of surfactants that can be added to the polymerization reaction include anionic compounds such as alkyl sulfates (such as sodium dodecylsulfate), alkyl ether sulfates, alkyl sulfonates, aryl sulfonates (such as alkylbenzene sulfonates, methylester sulfonates, and alpha-olefin sulfonates), sulfonates of alkylsuccinates or a combination comprising one or more of the foregoing. The surfactant can comprise alkyl sulfates and, specifically, one or more of sodium dodecylsulfate, sodium alkyl benzene sulfonate, and sodium alkyl sulfate.

Optionally, the surfactant can be generated in situ, e.g., using water soluble-free radical initiators. The in situ generated surfactant can be the reaction product of the vinyl monomer as described above and a water-soluble free radical initiator. For example, the in situ generated surfactant can be polystyrene sulfate and can be formed via the polymerization of dissolved styrene monomers and a water-soluble, free radical, initiator (such as ammonium, potassium, or sodium persulfate). The water soluble initiator can be present in an amount of 2 ppm to 10 ppm, specifically, 4 ppm to 6 ppm based on a total weight of monomer.

A further element of the polymerization system is a suspending agent such as tricalcium phosphate (TCP) (e.g., wet-grinded tricalcium phosphate). The tricalcium phosphate can have a weight-cumulative 95% ($D_{95}$) particle size distribution (as measured along a major axis (i.e., the longest axis)) of less than or equal to 1 micrometer, specifically, less than or equal to 0.5 micrometers. The tricalcium phosphate can have a weight-average particle diameter, which is an index of particle diameter (as measured along a major axis), of less than or equal to 0.4 micrometers, specifically, less than or equal to 0.3 micrometers.

The tricalcium phosphate can be present in an amount of 0.01 wt % to 10 wt %, specifically 0.05 wt % to 5 wt %, and more specifically 0.1 wt % to 2 wt %, based on the total weight of vinyl aromatic monomer. If the amount of tricalcium phosphate is too low, i.e. less than 0.01 wt %, the suspension may not stabilize.

In addition to the $CO_2$ generating initiator, surfactant, and vinyl monomers, the polymerization system can include a pH stabilizing agent. The pH stabilizing agent can be any agent that reacts with an acid species (e.g., the acid generated by the reaction of $CO_2$ with water) to retain the pH above 7 for a period of time to attain the desired viscosity and particle size distribution. The pH stabilizing agent can comprise, for example, one or more of a water soluble phosphate, a bicarbonate, and a salt thereof, as well as combinations comprising at least one of the foregoing stabilizing agents. The pH stabilizing agent can comprise, for example, phosphate and/or bicarbonate salts of sodium, potassium, calcium, ammonium, rubidium, caesium, or combinations comprising at least one of the foregoing. The pH stabilizing agent can comprise trisodium phosphate and/or sodium bicarbonate. The pH stabilizing agent can be used as hydrates or anhydrous.

The pH stabilizing agent can be present in an amount of 0.01 wt % to 0.2 wt %, specifically 0.01 wt % to 0.1 wt %, based on the total weight of vinyl monomers. Excessive amounts of pH stabilizing agent, i.e. greater than or equal to 0.1 wt %, can be harmful and can result in solidification of the suspension.

Additives (also referred to as processing aids) can be added to the polymerization system at any time: before, during, and/or after the completion of polymerization process. For example, additives can be added in the polymerization reactor, and/or to the particles after a drying step. The additive(s) can comprise, for example, nucleating agents (such as ethylenebisstearamide, methylenebisstearamide, polyethylene waxes (e.g., POLYWAX 500, POLYWAX 1000, POLYWAX 2000), and ethylene-vinyl acetate copolymers); chain transfer agents (such as an alkyl mercaptan such as dodecyl mercaptan and α-methylstyrene dimmer); lubricants; flame retarding agents (such as hexabromocyclododecane (HBCD) and synergistic dicumyl peroxide (DI-CUP)); thermal insulation enhancing agents (such as graphite powder or carbon black); antistatic agents; antilumping agents; dyes; fillers; stabilizers; cooling enhancers; and combinations comprising at least one of the foregoing additives. Such additives can be applied in any effective amount to achieve the desired function. The additive can be present in an amount of less than or equal to 5 wt % (e.g., greater than 0 wt % to 5 wt %), based on the total weight of the monomeror polymer product.

The additive can comprise a blowing agent which may be included to make the polymer particle an expandable particle. The blowing agent can have a boiling point below a melting point of the polymer so that upon heating of the polymer particles the blowing agent will vaporize and leave the particles thereby expanding the particles. Blowing agents can comprise $C_3$ to $C_7$ hydrocarbons, (such as propane, butane, isobutane, n-pentane, isopentane, cyclopentane, hexane, and hexane isomers), and combinations comprising at least one of the foregoing, in any proportions.

The additive can comprise a nucleating agent that can promote the uniform dispersion of the blowing agent throughout the particles. The nucleating agent can comprise ethylene bisstearamide, methylene bisstearamide, polyethylene waxes (such as POLYWAX™ 500, POLYWAX™ 1000, POLYWAX™ 2000), or a combination comprising one or more of the foregoing.

The polymerization can occur via suspension polymerization. A vinyl monomer, aqueous media, a $CO_2$ generating initiator, surfactant (e.g., a first quantity of surfactant and/or a surfactant generating initiator), a first quantity of tricalcium phosphate, a pH stabilizing agent, and optional additive(s) can be added to a reaction vessel (herein also referred to as a reactor) to form a suspension. The components can be added in any order and in any combination with one another and can be added with or without agitation or the aqueous media and a first quantity of tricalcium phosphate can be added to the reaction vessel and the temperature can be increased to be 88° C. or greater, specifically 90 to 100° C., and the remaining components can be added thereafter. The aqueous media can be added to the reaction vessel at room temperature or can be preheated, for example to a temperature of 88° C. or greater, specifically 90 to 100° C., more specifically from 90 to 95° C. The vinyl monomer can be added at a temperature of 95° C. or less, specifically 90 to 95° C. In some embodiments, the initial pH of the mixture can be greater than 7, specifically greater than or equal to 9, more specifically greater than or equal to 10, even more specifically greater than or equal to 11.

The polymerization reaction can be carried out in the reaction vessel employing agitator(s), and time and temperature cycle(s). For example, the polymerization can be carried out in two stages, where the first stage has a reaction temperature of 75° C. to 100° C., specifically 80° C. to 95° C., which can be maintained until a desired degree of polymerization is attained, for example, a degree of polymerization of 65% (e.g., for a period of 1 to 8 hours, specifically 1.5 to 5 hours). During the polymerization, the density and/or the viscosity can be monitored to monitor the degree of polymerization. The density of the dispersed phase and the continuous phase can be monitored to determine when the densities of the two phases are substantially equal, or within 1 to 5% of each other. A second phase of polymerization can then be carried out at for example an elevated temperature while the beads are simultaneously impregnated with the blowing agent. Before the beginning of this second phase of polymerization, one or more of a second quantity of a tricalcium phosphate, a second quantity of a surfactant or a surfactant generating radical initiator, and an optional blowing agent can be added to the reaction vessel and the temperature can then be increased to a temperature of 100° C. to 200° C., specifically 115° C. to 150° C., more specifically 120° C. to 130° C. The temperature can be maintained for a period sufficient to complete polymerization. For example, the temperature can be maintained for a period of 1 to 4 hours, specifically 2 to 3 hours. The polymerization can occur under agitation when the agitator speed can vary or can be held constant for the duration of the reaction.

The resulting polymer in the form of particles can be separated from the suspension by using, for example, a centrifuge. The separated polymer particles can be dried, actively and/or passively, e.g., through the introduction of a gas, e.g., in a fluid bed dryer or by flash drying. The polymer particles can be screened; during the screening step, the particles can be separated into fractions with different sizes.

The polymer particles can optionally be coated with a coating composition before or after the screening step. The coating composition can comprise another polymer (e.g., a polymer that is different than the polymer particles composition) and optional functional agent(s) (such as a release agent, antistatic agent, anti-lumping agent, and combinations comprising at least one of the foregoing). The polymer particles can, for example, be coated in batch on continuous mode. The polymer particles obtained in the present process can be employed in numerous fields (such as in construction, consumer goods, household goods, automotive, electrical, and medical devices). Some examples of possible products include protective packaging, insulation, display, appliances, containers, and cups.

The process can result in narrow particle size distributions where greater than or equal to 50 wt % of the particles are in a single grade, specifically, greater than or equal to 65 wt %, more specifically, greater than or equal to 80 wt %, based upon a total weight of the polymer particles. The process can result in greater than or equal to 50 wt %, specifically, greater than or equal to 60 wt %, specifically, greater than or equal to 70 wt %, specifically, greater than or equal to 80 wt %, more specifically, greater than or equal to 90 wt % of particles with a large particle size, for example 1.4 to 2.5 mm, specifically 1.5 to 2.3 mm. The process can result in greater than or equal to 50 wt %, specifically, greater than or equal to 60 wt %, specifically, greater than or equal to 70 wt %, more specifically, greater than or equal to 80 wt % of particles, even more specifically, greater than or equal to 90 wt % of particles with an intermediate particle size, for example 0.8 to 1.4 mm, specifically 0.8 to 1.1 mm or 1.1 to 1.4 mm. The process can result in greater than or equal to 50 wt %, specifically, greater than or equal to 60 wt % of particles, more specifically, greater than or equal to 70 wt %, even more specifically, greater than or equal to 80 wt % of particles with a small particle size, for example 0.4 to 0.8 mm.

The process can result in the elimination, 0 wt %, or near elimination, less than or equal to 1.5 wt %, specifically, less than or equal to 0.2 wt %, of fines production. The process can result in the elimination, 0 wt %, or near elimination, less than or equal to 1.5 wt %, specifically, less than or equal to 0.2 wt %, of oversize bead production. The elimination or near elimination of fines and/or oversize bead production is surprising as commercial processes typically result in approximately 2 to 5% fines and approximately 2 to 3% oversize bead depending upon the grade being targeted.

The following examples are provided to illustrate the method of preparing the particles of the present disclosure. The examples are merely illustrative and are not intended to limit methods made in accordance with the disclosure to the materials, conditions, or process parameters set forth therein.

EXAMPLES

The following examples were prepared as described in the method section below where the components list can be found in Table 1 and where the amounts of each component and the agitator speed for each example can be found in the subsequent tables.

TABLE 1

| Component | Function |
| --- | --- |
| Water, deionized | Aqueous media |
| Styrene, contains 10 ppm TBC (4-tert-butylcatechol) inhibitor | Monomer |
| Benzoyl peroxide (BPO) | Free radical initiator which generates $CO_2$ gas as a by product |
| Tertiarybutylphosphine (TBP) | Free radical initiator for the second stage of polymerization at higher temperature |
| Polyethylene (Polywax* 1000) | Nucleating agent/Multipurpose additive |
| Tricalcium phosphate (TCP) | Suspending Agent |
| Trisodium phosphate (TSP) | pH stabilizing agent |
| Sodium bicarbonate | pH stabilizing agent |
| Ammonium persulfate (AP) | Free radical water soluble initiator to generate in situ surfactant |
| Ammonium lauryl sulfate (ALS) | Surfactant (to maintain fluidity of the suspension and to disperse the blowing agent as it enters the reactor) |
| Pentane | Blowing agent |
| hexabromocyclododecane (HBCD) | Flame retardant |
| dicumyl peroxide (DICUP) | High temperature peroxide to function as a synergist with the Flame retardant |

Method

A batch polymerization reactor fully equipped with an agitator, baffles, raw material charging system, inert gas purging facilities, temperature control system with ±0.5° C. controllability, and the down-stream product handling system was prepared by cleaning and flushing with water. Deionized water was then charged to the reactor and heated to 95° C. under agitation, where the deionized water was distilled deionized water with a conductivity of less than 2.5 micro Siemens with a pH in the range of from 6 to 7.5. A first wet-grinded tricalcium phosphate was charged to the reactor. For batches that utilized a pH stabilizing agent, either trisodium phosphate or sodium bicarbonate was charged to the reactor. The cold styrene monomer was charged into the reactor at a temperature of 95° C., after which the temperature of the components in the reactor dropped to below 80° C.

When the reactor reached 80° C., benzoyl peroxide, TBP, POLYWAX™ 1000, and additives such as DICUP and HBCD were added. The reactor was further heated and the polymerization time was considered to be at time equal to zero when the batch temperature reached 88° C. Ammonium persulfate dissolved in a minimal amount of deionized water was added after 90 minutes of polymerization. Samples were taken from the reactor periodically between 2 and 3.5 hours for visual inspection and to monitor the growth of the particles. A reference time was also established from the samples to establish when the density of the dispersed phase and the continuous phase became equal, which occurred at about 68% conversion of the styrene monomer to polystyrene.

Where added, a second amount of tricalcium phosphate, a second amount of ammonium persulfate, and/or a second amount of ALS were charged to the reactor. The reactor was sealed and the pressure tested for leaks. A pentane blowing agent was then charged to the reactor. The batch temperature was increased to 130° C. and maintained at this temperature for 2 to 3 hours. The batch temperature was then cooled to 32 to 33° C., the reactor was vented, and the reactor contents were discharged to a holding tank.

The expandable polystyrene particles were separated from the slurry using a centrifuge. An anti-static agent was added to the particles that were thereafter dried using a flash dryer. The dried particles were passed through a cyclone and collected in a hopper. The particles were classified using screens into various size grades. The quantities of each grade was measured and recorded. Optional coatings were applied and the particles were packaged.

Comparative Examples 1-2 and Examples 3-8

Effect of Trisodium Phosphate on the Polymerization of Polystyrene Particles in a 30 Liter Reactor Comparative Examples 1-2 and Examples 3-8 were prepared as described above using the amounts as described in Table 2, where kg is kilograms, to illustrate the effect of trisodium phosphate on particle size.

TABLE 2

| Components | CE1 | CE2 | E3 | E4 | E5 | E6 | E7 | E8 |
|---|---|---|---|---|---|---|---|---|
| Water, kg | 1225 | 1225 | 1025 | 1025 | 1025 | 1170 | 1295 | 1025 |
| Styrene, kg | 950 | 950 | 900 | 900 | 900 | 1000 | 1000 | 900 |
| BPO (75%), kg | 4.43 | 4.43 | 3.6 | 3.6 | 4.2 | 4.66 | 4.66 | 4.2 |
| TBP, kg | 1.66 | 1.66 | 1.58 | 1.58 | 1.58 | 1.75 | 1.75 | 1.58 |
| Polywax ™, kg | 2.1 | 2.1 | 1.98 | 1.98 | 1.98 | 2.2 | 3.0 | 1.98 |
| HBCD, kg | 0 | 0 | 0 | 0 | 0 | 0 | 0 | 0 |
| DICUP, kg | 0 | 0 | 0 | 0 | 0 | 0 | 0 | 0 |
| TCP-1 (30% slurry), kg | 0.76 | 0.76 | 13.5 | 13.5 | 13.5 | 17.5 | 18 | 13.5 |
| TCP-2 (30% slurry), kg | 2.0 | 2.0 | 0 | 0 | 0 | 0 | 0 | 0 |
| TSP, kg | 0 | 0 | 0.495 | 0.495 | 0.72 | 0.65 | 0.75 | 0.63 |
| SB, g | 0 | 0 | 0 | 0 | 0 | 0 | 0 | 0 |
| AP-1, g | 3.8 | 3.8 | 3.6 | 3.6 | 8.1 | 7 | 7 | 3.6 |
| AP-2, g | 7.1 | 7.1 | 6.75 | 6.75 | 2.7 | 4 | 4 | 6.75 |
| ALS (28% slurry), g | 16 | 16 | 18 | 18 | 15.3 | 15 | 15 | 18 |
| Pentane, g | 70 | 70 | 0 | 0 | 0 | 75 | 75 | 0 |
| Agitator speed, rpm | 110 | 115 | 120 | 100 | 120 | 115 | 115 | 110 |
| BPO, wt % | 0.35 | 0.35 | 0.3 | 0.3 | 0.35 | 0.35 | 0.35 | 0.35 |
| HBCD, wt % | 0 | 0 | 0 | 0 | 0 | 0 | 0 | 0 |
| TCP, wt % | 0.08 | 0.45 | 0.45 | 0.45 | 0.45 | 0.45 | 0.45 | 0.45 |
| TSP, wt % | 0 | 0 | 0.055 | 0.055 | 0.08 | 0.065 | 0.075 | 0.07 |
| SB, wt % | 0 | 0 | 0 | 0 | 0 | 0 | 0 | 0 |
| AP, wt % | 0.0004 | 0.0004 | 0.0004 | 0.0004 | 0.0009 | 0.0007 | 0.0007 | 0.0004 |
| Mean Particle Diameter, mm | 0.85 | 0.84 | 1.04 | 1.44 | 0.70 | 0.81 | 1.21 | 1.49 |
| Particle Size % | | | | | | | | |
| <0.4 mm | 3 | 4 | 0 | 0 | 0.2 | 0 | 0 | 0 |
| 0.4-0.8 mm | 30 | 34 | 14 | 1 | 91 | 23 | 1 | 0 |
| 0.8-1.1 mm | 50 | 46 | 72 | 10 | 7 | 70 | 14 | 3 |
| 1.1-1.4 mm | 12 | 8 | 14 | 83 | 1 | 7 | 72 | 27 |
| 1.5-2.34 mm | 3 | 6 | 0 | 6 | 1 | 0 | 12 | 70 |
| >2.34 mm | 2 | 2 | 0 | 0 | 0 | 0 | 0 | 0 |

As can be seen from the results in Table 2, the addition of trisodium phosphate resulted in a much narrower particle size distribution as those particles made without the pH stabilizing agent. Furthermore, as can be seen in Table 2, the production of fines and oversize beads was eliminated in all Examples 3-8 except for Example 5, which displayed a minimal amount of fines of 0.2% as compared to the 3 and 4% of Comparative Examples 1 and 2, respectively.

Table 2 further shows in Examples 3 and 4 that agitator speed can be used to adjust the final particle size, where a faster agitation rate results in smaller particles, while maintaining a narrow particle size distribution. Specifically, Examples 3 and 4 were performed under the same reaction conditions except that the agitator speed of Example 3 was 120 rpm and the agitator speed of Example 4 was 100 rpm. Example 3 resulted in 72% of the particles with particle sizes of 0.8-1.1 mm and Example 4 resulted in 83% of the particles with particle sizes of 1.1-1.4 mm.

Comparative Example 9 and Examples 10-11

Effect of Sodium Bicarbonate on the Polymerization of Polystyrene Particles in a 2 m³ Reactor Comparative Example 9 and Examples 10-11 were prepared as described above using the amounts as described in Table 3 to illustrate the effect of sodium bicarbonate on particle size and to illustrate the scale up ability production of particles in a pilot plant setting

TABLE 3

| Components | CE9 | E10 | E11 | CE12 | E13 |
|---|---|---|---|---|---|
| Water, kg | 12.4 | 12.4 | 12.4 | 26000 | 26000 |
| Styrene, kg | 12 | 12 | 12 | 25000 | 25000 |
| BPO (75%), kg | 0.056 | 0.056 | 0.056 | 95 | 115 |
| TBP, kg | 0.021 | 0.0.21 | 0.0.21 | 35 | 44 |
| Polywax, kg | 0.0264 | 0.0264 | 0.0264 | 25 | 25 |
| HBCD, kg | 0 | 0 | 0 | 150 | 163 |
| DICUP, kg | 0 | 0 | 0 | 100 | 100 |
| TCP-1 (30% slurry), kg | 0.056 | 0.185 | 0.185 | 17 (100%) | 113 (100%) |
| TCP-2 (30% slurry), kg | 0.088 | 0 | 0 | 25 | 0 |
| TSP, kg | 0 | 0 | 0 | 0 | 20 |
| SB, g | 0 | 5.6 | 6.2 | 0 | 0 |
| AP-1, g | 4.8 | 4.8 | 4.8 | 80 | 225 |
| AP-2, g | 9 | 9 | 9 | 150 | 75 |
| ALS (28% slurry), g | 1 | 1 | 1 | 400 | 400 |
| Pentane, g | 980 | 980 | 980 | $2 \times 10^6$ | $2 \times 10^6$ |
| Agitator speed, rpm | 185 | 275 | 275 | 47 | 50 |
| BPO, wt % | 0.35 | 0.35 | 0.35 | 0.28 | 0.35 |
| HBCD, wt % | 0 | 0 | 0 | 0.6 | 0.65 |
| TCP, wt % | 0.14 | 0.45 | 0.45 | 0.07 | 0.45 |
| TSP, wt % | 0 | 0 | 0 | 0 | 0.08 |
| SB, wt % | 0 | 0.045 | 0.05 | 0 | 0 |
| AP, wt % | 0.0004 | 0.0004 | 0.0004 | 0.00032 | 0.0009 |
| Mean Particle Diameter, mm | 0.99 | 0.84 | 1.2 | 0.79 | 1.50 |
| Particle Size % | | | | | |
| <0.4 mm | 2 | 0 | 0 | 3 | 0 |
| 0.4-0.8 mm | 40 | 21 | 1 | 48 | 5 |
| 0.8-1.1 mm | 31 | 65 | 18 | 31 | 15 |
| 1.1-1.4 mm | 21 | 13 | 72 | 16 | 14 |
| 1.5-2.34 mm | 6 | 1 | 9 | 2 | 66 |
| >2.34 mm | 0 | 0 | 0 | 0 | 0 |

As can be seen from the results in Table 3, the addition of sodium bicarbonate resulted in a much narrower particle size distribution as those particles made without the pH stabilizing agent. Furthermore, as can be seen in Table 3, the production of fines and oversize beads was eliminated in all Examples 10-11 as compared to the fines production of 2% of Comparative Example 9.

Comparative Example 12 and Example 13

Effect of Trisodium Phosphate on the Polymerization of Polystyrene Particles in a 60 m³ Reactor Comparative Example 12 and Example 13 were prepared as described above using the amounts as described in Table 3 to illustrate the effect of trisodium phosphate on particle size and to illustrate the scale up ability production of particles in a factory setting.

As can be seen from the results in Table 3, the addition of trisodium phosphate resulted in a much narrower particle size distribution as those particles made without the pH stabilizing agent. Furthermore, as can be seen in Table 3, the production of fines and oversize beads was eliminated in Example 13 as compared to the fines production of 3% of Comparative Example 12.

The results as presented in Examples 1-13 clearly demonstrate that pH stabilizing agents that are able to keep the pH of the polymerization system above 7 for a period of time to build the viscosity of the dispersed phase, results in the virtual elimination of fines and higher yields of target grade material. The Applicants believe that further optimization of the process will result in a further increase in the targeted grade yield and in even narrower particle size distributions.

Set forth below are some embodiments of the methods of producing vinyl polymer particles as disclosed herein.

Embodiment 1

A method of producing vinyl polymer particles by suspension polymerization comprising: combining an aqueous media and a tricalcium phosphate to a reaction vessel; adding a pH stabilizing agent to the reaction vessel; adding a vinyl monomer to the reaction vessel; adding a peroxide initiator, which also generates $CO_2$ as a result of primary or secondary decomposition, to the reaction vessel; adding surfactant or a water soluble free radical initiator to generate surfactant in situ to the reaction vessel; maintaining the reactor contents at greater than or equal to 90° C. until a density of a dispersed phase becomes substantially equal to that of a continuous phase, thereby forming a suspension having an initial pH; optionally adding a second quantity of tricalcium phosphate and optionally a second quantity of surfactant or optionally a second quantity of water soluble free radical initiator to generate surfactant in situ to the reaction vessel; adding a blowing agent to the reaction vessel; raising the temperature of the reaction vessel to greater than or equal to 100° C. (e.g., 100-200° C.) and holding at said temperature for greater than or equal to 1 hour; and collecting polymer particles having a particle size distribution.

Embodiment 2 a method of producing vinyl polymer particles by suspension polymerization comprising: combining an aqueous media and a tricalcium phosphate to a reaction vessel; adding a pH stabilizing agent to the reaction vessel; adding a vinyl monomer to the reaction vessel; adding a peroxide initiator, which also generates $CO_2$ as a result of primary or secondary decomposition, to the reaction vessel; adding surfactant or a water soluble free radical initiator to generate surfactant in situ to the reaction vessel; maintaining the reactor contents at greater than or equal to 90° C. until a density of a dispersed phase becomes substantially equal to that of a continuous phase, thereby forming a suspension having an initial pH; optionally adding a second quantity of tricalcium phosphate and optionally a second quantity of surfactant or optionally a second quantity of water soluble free radical initiator to generate surfactant in situ to the reaction vessel; adding a blowing agent to the reaction vessel; raising the temperature of the reaction vessel to greater than or equal to 100° C.; maintaining the initial pH until a degree of polymerization of the vinyl monomer is greater than or equal to 68%; and collecting polymer particles having a particle size distribution.

Embodiment 3

A method of producing vinyl polymer particles by suspension polymerization comprising: adding a vinyl monomer, an aqueous media, a CO2 generating initiator, tricalcium phosphate, and a pH stabilizing agent to a reaction vessel under agitation to form a suspension; and polymerizing at a temperature of greater than or equal to 90° C., the vinyl monomer to result in polymerized particles with a particle size distribution.

Embodiment 4

The method of Embodiment 3, wherein the initial pH is maintained until the density of a dispersed phase becomes substantially equal to that of a continuous phase.

Embodiment 5

The method of any of Embodiments 1-4, wherein the pH stabilizing agent comprises one or more of a water soluble phosphate, a bicarbonate, and a salt thereof.

Embodiment 6

The method of any of Embodiments 1-5, wherein the pH stabilizing agent comprises one or both of trisodium phosphate and sodium bicarbonate.

Embodiment 7

The method of any of Embodiments 1-6, wherein the vinyl monomer comprises one or more of styrene, alpha-methylstyrene, p-methylstyrene, and p-ethylstyrene.

Embodiment 8

The method of any of Embodiments 1-7, wherein the CO2 generating initiator comprises an organic peroxide.

Embodiment 9

The method of any of Embodiments 1-8, wherein the CO2 generating initiator comprises one or more of dibenzoyl peroxide, dilauroyl peroxide, 2 tert-butylperoxy-benzoate, tert-butylperoxy-2-ethylhexyl carbonate, tert-butylperoxy-isopropyl carbonate, and tert-amylperoxy-2-ethylhexyl carbonate.

Embodiment 10

The method of any of Embodiments 1-9, wherein the surfactant is generated in situ via a water soluble initiator that comprises one or more of ammonium, potassium, and sodium persulfate.

Embodiment 11

The method of any of Embodiments 1-10, wherein the polymerized particles comprise less than or equal to 1.5 wt % of particles having a size, as measured along a major axis, of less than 0.4 mm.

Embodiment 12

The method of any of Embodiments 1-11, wherein the polymerized particles are free of at least one of fines and oversize beads.

Embodiment 13

The method of any of Embodiments 1-12, further comprising adding a blowing agent before polymerizing.

Embodiment 14

The method of any of Embodiments 1-13, further comprising adding a blowing agent during polymerizing.

Embodiment 15

The method of any of Embodiments 1-14, further comprising adding a blowing agent after polymerizing.

Embodiment 16

The method of any of Embodiments 1-15, wherein the polymerized particles are expandable.

Embodiment 17

The method of any of Embodiments 1-16, wherein the polymerized particles are expandable polystyrene.

Embodiment 18

The method of any of Embodiments 1-17, wherein the initial pH of the suspension is greater than 7.

Embodiment 19

The method of any of Embodiments 1-18, wherein the initial pH of the suspension is greater than or equal to 9.

Embodiment 20

The method of any of Embodiments 1-19, wherein the initial pH of the suspension is greater than 7 to 11.

Embodiment 21

The method of any of embodiments 1-20, wherein the initial pH is maintained until a degree of polymerization of the vinyl monomer greater than or equal to 68%.

Embodiment 22

The method of any of Embodiments 1-21, wherein the particle size distribution has greater than or equal to 80 wt % of the particles with sizes ranging of 0.4 to 0.8 mm.

Embodiment 23

The method of any of Embodiments 1-21, wherein the particle size distribution has greater than or equal to 90 wt % of the particles with sizes ranging of 0.8 to 1.1 mm.

Embodiment 24

The method of any of Embodiments 1-21, wherein the particle size distribution has greater than or equal to 90 wt % of particles with sizes ranging 1.1 to 1.4 mm.

Embodiment 25

The method of any of Embodiments 1-21, wherein the particle size distribution has greater than or equal to 80 wt % of particles with sizes ranging 1.5 to 2.3 mm.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). "Or" means "and/or" unless the context specifies otherwise.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

While the disclosure has been described with reference to an exemplary embodiment, it will be understood by those skilled in the art that various changes can be made and equivalents can be substituted for elements thereof without departing from the scope of the disclosure. In addition, many modifications can be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

We claim:

1. A method of producing vinyl polymer particles by suspension polymerization comprising:
adding a vinyl monomer, an aqueous media, a $CO_2$ generating initiator, tricalcium phosphate, and a pH stabilizing agent comprising one or both of trisodium phosphate and sodium bicarbonate to a reaction vessel under agitation to form a suspension having an initial pH of greater than or equal to 9; polymerizing, at a temperature of greater than or equal to 90° C., the vinyl monomer to result in polymerized particles with a size distribution;
wherein the adding the pH stabilizing agent comprises adding 0.01 wt % to 0.2 wt % of the pH stabilizing agent based on a total weight of the vinyl monomer.

2. The method of claim 1, wherein the vinyl monomer comprises one or more of styrene, alpha-methylstyrene, p-methylstyrene, and p-ethylstyrene.

3. The method of claim 1, wherein the $CO_2$ generating initiator comprises an organic peroxide.

4. The method of claim 1, wherein the $CO_2$ generating initiator comprises one or more of dibenzoyl peroxide, dilauroyl peroxide, 2 tert-butylperoxy-benzoate, tert-butylperoxy-2-ethylhexyl carbonate, tert-butylperoxy-isopropyl carbonate, and tert-amylperoxy-2-ethylhexyl carbonate.

5. The method of claim 1, wherein a water soluble initiator that comprises one or more of ammonium, potassium, and sodium persulfate is added to the reaction vessel to generate a surfactant in situ.

6. The method of claim 1, wherein the particle size distribution has greater than or equal to 80% of the particles with sizes in the range of 0.4 to 0.8 mm, greater than or equal to 90% of the particles with sizes in the range of 0.8 to 1.1 mm, greater than or equal to 90% of particles with sizes in the range of 1.1 to 1.4 mm, or greater than or equal to 80% of particles with sizes in the range of 1.5 to 2.3 mm.

7. The method of claim 1, wherein the polymerized particles comprise less than or equal to 1.5 wt % of particles having a size, as measured along a major axis, of less than 0.4 mm.

8. The method of claim 1, wherein the polymerized particles do not comprise one or both of fines and oversize beads.

9. The method of claim 1, further comprising the step of adding a blowing agent before, during, or after the step of polymerizing.

10. The method of claim 1, wherein the polymerized particles are expandable.

11. The method of claim 1, wherein the polymerized particles are expandable polystyrene.

12. The method of claim 1, wherein the initial pH of the suspension is 9 to 11.

13. The method of claim 1, further comprising monitoring a density of a dispersed phase and a density of a continuous phase; wherein the initial pH is maintained until the density of the of dispersed phase and the density of the continuous phase are within 1 to 5% of each other.

14. The method of claim 1, wherein the initial pH is maintained until the density of a dispersed phase becomes substantially equal to that of a continuous phase.

15. The method of claim 1, wherein the initial pH of the suspension is greater than 10 to 11.

* * * * *